Jan. 1, 1935.  H. FRIESS  1,986,053
REWINDING APPARATUS FOR SOUND FILMS
Filed June 21, 1930
Fig. 1.
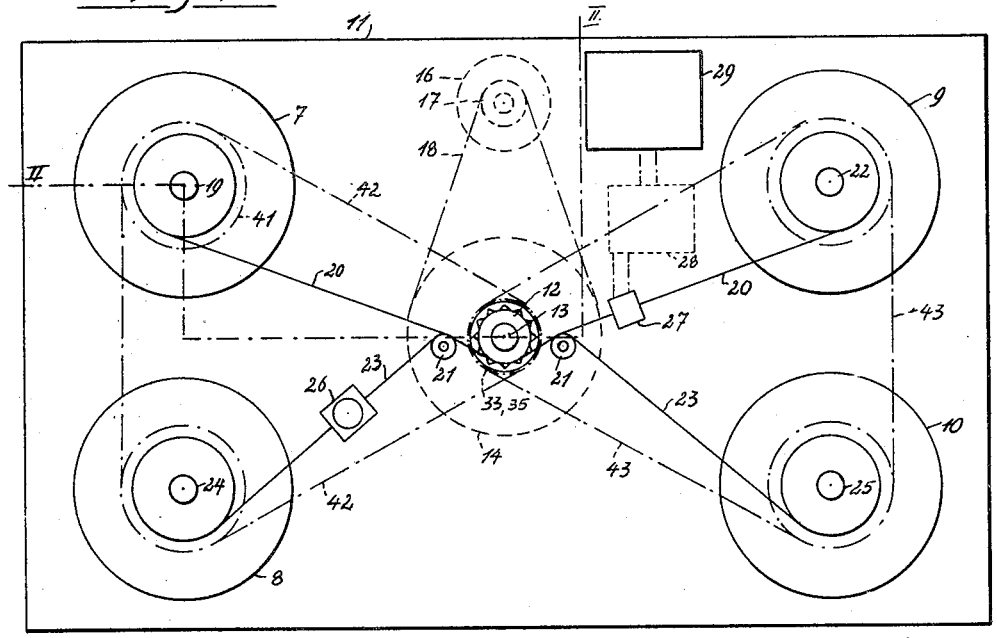
Fig. 3.
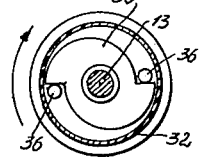
Fig. 4.
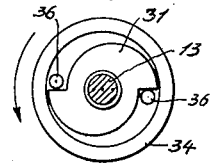
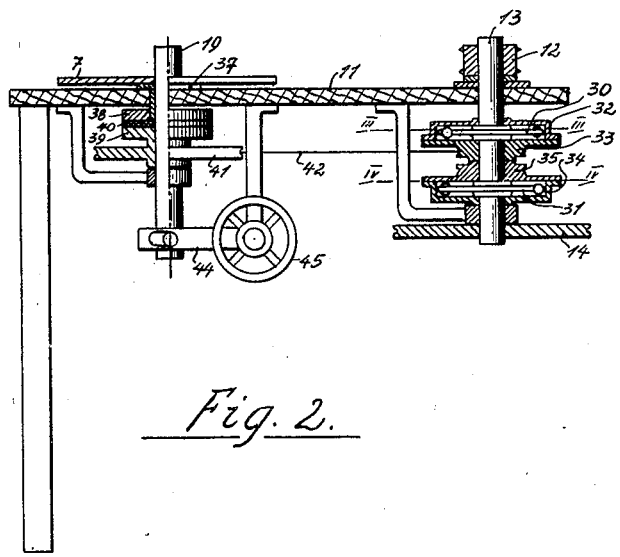
Fig. 2.
INVENTOR
Hans Friess
BY
Synnestvedt & Lechner
ATTORNEYS Patented Jan. 1, 1935

1,986,053

UNITED STATES PATENT OFFICE 1,986,053

REWINDING APPARATUS FOR SOUND FILMS

Hans Friess, Berlin, Germany

Application June 21, 1930, Serial No. 462,734
In Germany June 25, 1929

5 Claims. (Cl. 88—14)

This invention relates to an apparatus for rewinding and examining related sound and picture films, and, among the objects thereof, is the provision of a device of this character which is simple in operation and inexpensive to manufacture.

A further object is to so arrange the parts of the mechanism as to permit cutting and piecing of the film or films without removing them from the apparatus. In order to facilitate this operation, the invention contemplates the provision of means for examining both sound and picture records continuously, the said means being positioned to occupy the same relative positions as similar means occupy in commercial projectors.

As a further object, the invention contemplates the provision of mechanism for permitting removal of film from the apparatus at any stage in the examination thereof with a minimum of difficulty.

The invention still further contemplates a frictional arrangement for driving the film spools which will permit the film to be wound in either direction or to be stopped at will.

Apparatus for rewinding and examining film heretofore used has not proved satisfactory, particularly in handling sound films, for variations of speed quite permissible before the advent of sound records cannot be permitted at the present time, since the sound and picture records must be most carefully synchronized.

How the difficulties involved in the use of the mechanisms heretofore employed may be overcome and the objects of this invention obtained will appear from the following description, together with the accompanying drawing which illustrates a preferred embodiment of my invention, and in which:

Figure 1 is a plan view of the apparatus.

Figure 2 is a view, partly in section, taken on the line II—II of Figure 1, of a part of the apparatus.

Figures 3 and 4 are detail views of a part of the apparatus, taken on the lines III—III and IV—IV of Figure 2.

Referring now to Figure 1 of the drawing, the apparatus comprises four spools 7, 8, 9, 10, mounted on a table 11. Between the spools and in the same plane with them, a drum 12, having sprockets adapted to engage the perforations in a film, is provided. On the shaft 13, on which this drum is mounted, there is a disc 14 functioning as a drive pulley and fly wheel. This disc is driven from the motor 16 through pulley 17 and belt 18. On the axle 19 of the spool 7 is the film 20, carrying the sound record. This film is wound up past sprocket drum 12 and the guiding rollers 21 onto the axle 22 of the spool 9. The film 23, carrying the picture record, is on the axle 24 of the spool 8, and is likewise wound up past the sprocket drum 12 and the guide rollers 21 and onto the axle 25 of the spool 10. In the path of the picture film 23 a viewing device 26 is located, and in the path of the sound film 20 an aural device 27. The aural device 27 is connected to the amplifier 28, and the latter is connected, in turn, to the loud speaker 29. It is to be noted that the viewing apparatus 26 and the sound pick-up device 27 are separated by a distance equal to that between the gate and the sound pick-up devices of standard projectors. It is apparent that, since both films engage the sprocket of the drum 12 simultaneously, a perfect synchronism is assured. Moreover, it will be clear that, if a single film, having both sound and picture records thereon, is to be examined, this may be accomplished by winding film from spool 8 onto spool 9, so that it will pass both the sound pick-up and viewing devices as before.

In order to attain the capacity for operating the device in either direction, free wheel mechanism, illustrated in detail in Figures 3 and 4, is provided on the shaft 13. This free wheel mechanism comprises double eccentric discs 30 and 31. The disc 30 is surrounded by the casing 32, which carries the pulley 33, and the disc 31 is similarly surrounded by the casing 34, carrying the pulley 35. The casings 32 and 34 and the pulleys 33 and 35 are not fixed to the shaft 13. A driving connection, however, in one direction only is provided by means of the balls 36, for it will be apparent that when the shaft 13, on which the disc 30 is mounted, rotates in the direction of the arrow shown in Figure 3, the balls 36 will wedge between the disc 30 and the casing 32, and thereby drive the casing 32 and the pulley 33 which it carries. Similarly, when the shaft 13 rotates in the opposite direction, the balls will no longer be wedged between the eccentric disc 30 and the casing 32, and the pulley 33 will run free. When this condition occurs, a contrary situation applies to the lower free wheel mechanism shown in Figure 4, and the disc 31 will operate to drive the casing 34 and the pulley 35 carried thereby.

In order to permit stopping of the apparatus at any point, the drive to the winding-up spools is entirely frictional. It is effected in the following manner, reference being had to Figure 2 in which spool 7 is illustrated. The spool is supported by a sleeve 37 provided with a lower flange member 38. The flange 38 is separated from a second flange 39 by a vulcanite fiber disc 40. The member 39 carries the pulley 41 which is driven by the belt 42 from the pulley 35 of the main driving shaft 13. Thus rotation is imparted to the disc 7 by reason of the frictional engagement of the flanges 38 and 39 with the disc 40. It will be noted that the belt 42 also drives the disc 8 in a similar manner, while the belt 13 driven from pulley 35 operates discs 9 and 10.

In order to facilitate handling of the film in loading and unloading the device, the axles 19, 22, 24, and 25 are retractably mounted in such a way that by rotation of the wheel 45 and the arm 44, these shafts can be lowered vertically, thereby releasing the rolled-up film, which can be removed simply by pushing it away.

Since the only parts appearing above the table 11 are the spools 7, 8, 9 and 10, their respective shafts, the drum 12, guide wheels 21, and the visual and aural pick-up devices 26 and 27, it will be apparent that the film is readily accessible at any point in its travel from spool to spool and can be cut and patched with a minimum of difficulty, and can likewise be removed with ease. Moreover, the cutting and patching of the films to establish synchronization may be effected at exactly the proper place, because the film can be stopped instantaneously at any given point because the drive is entirely frictional, and stopping of one film automatically stops rotation of the sprocket 12 so that the travel of the other film is simultaneously arrested.

What is claimed is,

1. An apparatus for rewinding and examining sound and picture film including in combination a winding spool and an unwinding spool for the film, a drum for conveying the film, frictional discs for driving said spools, free wheel mechanisms associated with the shaft of said drum and operatively connected to the respective discs for driving one of said spools when the drive is in one direction, and the other of said spools when the drive is in the other direction, and a sound gate and a viewing apparatus interposed in the path of said film, the distance between said gate and viewing apparatus being equal to that of standard projectors.

2. In apparatus for rewinding, examining, cutting and piecing related sound and picture films the combination which includes a pair of spindles for the take-up reels, and a pair of spindles for the pay-out reels; a sprocket drum, and guide means for bringing the films into superposed relation thereon; a drive shaft, and counter-acting free-wheel mechanisms mounted thereon; a sleeve having a flange adapted to frictionally engage a film reel, a second flange in frictional engagement with the first flange and a pulley in frictional engagement with the second flange, on each spindle; an operative connection between the pulleys on the take-up reel spindles and one of said free-wheel mechanisms; and an operative connection between the pulleys on the pay-out reel spindles and the other free-wheel mechanisms, whereby the frictional devices and the free-wheel mechanisms cooperate to permit instantaneous stoppage or reversal of the film travel.

3. In apparatus for rewinding, examining, cutting and piecing sound and picture film the combination which includes spindles for the pay-out and take-up reels; a sleeve having a flange for frictionally engaging a reel, on each spindle; a reversible driving member, and operative connections from the same to the flanged sleeves, including a friction disc in contact with the sleeve on each spindle; and counter-acting over-running clutch devices interposed among the operative connections for selectively driving said friction discs in accordance with the direction of movement of the driving member, whereby upon sudden stoppage or reversal of the film travel, slippage may freely occur.

4. In apparatus for rewinding and examining related sound and picture films, the combination of a pair of spools for the sound film, a pair of spools for the picture film, drum means for simultaneously conveying the films, guide means for bringing the films into superposed relation on said drum means, a driving shaft adapted to be selectively rotated in opposite directions, free wheel mechanisms mounted on and selectively driven by said shaft, and frictional means associated with said spools and operatively connected to said free wheel mechanisms for driving certain of the spools when the shaft rotates in one direction and others of said spools when the shaft rotates in the opposite direction.

5. In apparatus for rewinding and examining sound and picture film, the combination which includes a winding spool and an unwinding spool for the film, a drum for conveying the film, frictional discs for driving said spools; a reversible source of power; an over-running clutch operatively connected to one of said friction discs and arranged to drive the same in one direction, an overrunning clutch operatively connected to the other friction disc and arranged to drive the same in the opposite direction, and operative connections between said over-running clutches and the source of power, whereby when one of said spools is being driven, the other runs free, and vice versa.

HANS FRIESS.